(No Model.)
H. M. DU BOIS.
TIRE FOR VEHICLE WHEELS.
No. 412,699. Patented Oct. 8, 1889.
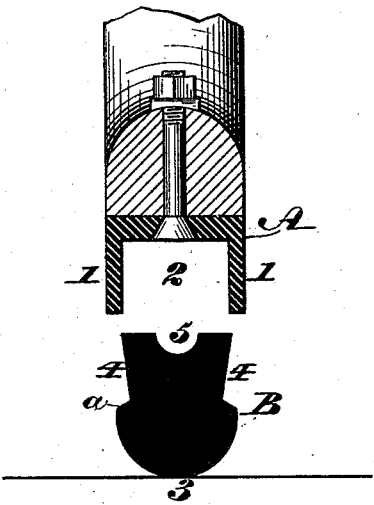
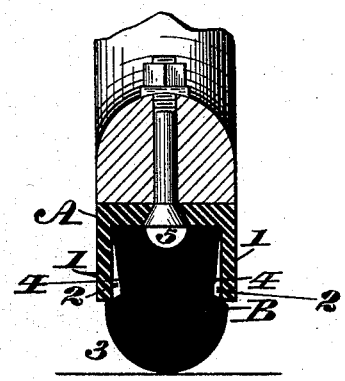
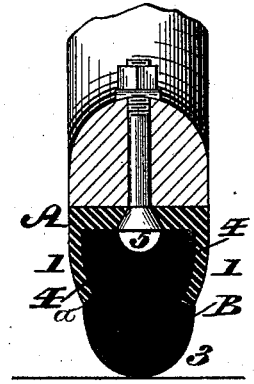
Witnesses
L. Douville,
A. P. Jennings.
Inventor
Howard M. Du Bois
By his Attorneys
Wiedersheim & Fairbanks

UNITED STATES PATENT OFFICE.

HOWARD M. DU BOIS, OF PHILADELPHIA, PENNSYLVANIA.

TIRE FOR VEHICLE-WHEELS.

SPECIFICATION forming part of Letters Patent No. 412,699, dated October 8, 1889.

Application filed November 1, 1888. Serial No. 289,743. (No model.)

*To all whom it may concern:*

Be it known that I, HOWARD M. DU BOIS, a citizen of the United States, residing in the city and county of Philadelphia, State of Pennsylvania, have invented a new and useful Improvement in Tires for Vehicle-Wheels, which improvement is fully set forth in the following specification and accompanying drawings.

My invention relates to improvements in tires; and it consists in the combination, with a channeled tire, of an elastic tread having its inner portion provided with inwardly-inclined sides and its outer portion forming shoulders on which the ends of the side walls of the tire bear, so that the outer surface of the sides of the tire and tread are flush at the joint.

It also consists in combining with the above an air-cushion.

The several figures represent sections of a tire embodying my invention, the parts being shown separated in Figure 1.

Similar letters and numerals of reference denote corresponding parts in the several figures.

Referring to the drawings, A represents a tire, and B the tread thereof, said tire being adapted to be secured to a wheel in well-known manner.

The tire is formed of suitable wrought-iron or steel, with side flanges 1 primarily parallel, producing a circumferential channel 2.

The tread B is formed of soft rubber, having the sides of its inner portion partly oblique or inclined inwardly, so as to form shoulders *a* at the junction of the outer and inner portions. The tread is sprung into the channel 2 and the flanges 1 are subjected to pressure, so as to be curved or bent inwardly, and thus closed against the oblique sides of the tread, whereby the tread is clinched and locked by the flanges and securely held on the tire, it being seen that the tire is composed of both metal and rubber and may be conveniently manufactured. The flanges 1 and oblique sides 4 of the tread form a dovetailed joint between said parts, so that the outward displacement of the tread is prevented. Furthermore, the sides of the tread are flush, or approximately so, with the outer surface of the tire, thus avoiding projections on the side of the tread, and thereby preventing to a great extent the engagement or entanglement of the wheel by obstacles on the road or in the path of the said wheel. In the inner surface of the tread is a circumferential channel 5, which forms an air-cushion and serves to lighten or reduce the weight of the tread. The air-cushion also forms in the inner peripheral portion of the rim a groove which is coincident with the heads of the bolts which secure the tire to the wheel, thus preventing the rim from rubbing against said heads, and also increasing the elasticity of said portion of the rim, it being seen that the sides of the rim are rendered somewhat compact by the compression of the flanges of the tire; hence the provision of the groove permits the expansion of said portion.

Having thus described my invention, what I claim as new, and desire to secure by Letters Patent, is—

A wheel having wrought-iron tire with side flanges, bolts securing the tire to the rim of said wheel, an elastic tread having the inclined sides 4 and the inclined shoulders *a*, and provided with the recess 5 on its inner side, forming a circumferential groove coinciding with the heads of the bolts, the side flanges of the tire being inwardly inclined and embracing the inclined sides 4, so as to be flush with the outer face of the tread, their lower ends being in contact with the inclined shoulders *a*, said parts being combined substantially as described.

HOWARD M. DU BOIS.

Witnesses:
JOHN A. WIEDERSHEIM,
A. P. JENNINGS.